(12) United States Patent
Blocksome

(10) Patent No.: US 8,082,424 B2
(45) Date of Patent: Dec. 20, 2011

(54) DETERMINING WHEN A SET OF COMPUTE NODES PARTICIPATING IN A BARRIER OPERATION ON A PARALLEL COMPUTER ARE READY TO EXIT THE BARRIER OPERATION

(75) Inventor: Michael A. Blocksome, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1175 days.

(21) Appl. No.: 11/832,192

(22) Filed: Aug. 1, 2007

(65) Prior Publication Data

US 2009/0037707 A1    Feb. 5, 2009

(51) Int. Cl.
G06F 7/38    (2006.01)

(52) U.S. Cl. ......................................... 712/220
(58) Field of Classification Search .................. None
See application file for complete search history.

(56) References Cited

U.S. PATENT DOCUMENTS

| | | | |
|---|---|---|---|
| 5,063,562 A | 11/1991 | Barzilai et al. |
| 5,095,444 A | 3/1992 | Motles |
| 5,491,691 A | 2/1996 | Shtayer et al. |
| 5,815,793 A | 9/1998 | Ferguson |
| 5,859,981 A | 1/1999 | Levin et al. |
| 5,862,381 A | 1/1999 | Advani et al. |
| 5,912,893 A | 6/1999 | Rolfe et al. |
| 5,918,020 A | 6/1999 | Blackard et al. |
| 5,937,201 A | 8/1999 | Matsushita et al. |
| 5,953,336 A | 9/1999 | Moore et al. |
| 5,982,771 A | 11/1999 | Caldara et al. |
| 6,057,839 A | 5/2000 | Advani et al. |
| 6,115,357 A | 9/2000 | Packer et al. |
| 6,118,777 A | 9/2000 | Sylvain |
| 6,126,331 A | 10/2000 | Komatsu et al. |
| 6,167,490 A | 12/2000 | Levy et al. |
| 6,253,372 B1 | 6/2001 | Komatsu et al. |
| 6,336,143 B1 | 1/2002 | Diedrich et al. |
| 6,438,702 B1 | 8/2002 | Hodge |
| 6,490,566 B1 | 12/2002 | Schmidt |
| 6,600,721 B2 | 7/2003 | Edholm |

(Continued)

OTHER PUBLICATIONS

Moreira, et al.; The Blue Gene/L Supercomputer: A Hardware and Software Story; International Journal of Parallel Programming; Jun. 2007; pp. 181-206; vol. 35, No. 3, Springer Science+Business Media LLC.; USA.

(Continued)

*Primary Examiner* — Eddie P Chan
*Assistant Examiner* — John Lindlof
(74) *Attorney, Agent, or Firm* — Biggers & Ohanian, LLP

(57) ABSTRACT

Methods, apparatus, and products are disclosed for determining when a set of compute nodes participating in a barrier operation on a parallel computer are ready to exit the barrier operation that includes, for each compute node in the set: initializing a barrier counter with no counter underflow interrupt; configuring, upon entering the barrier operation, the barrier counter with a value in dependence upon a number of compute nodes in the set; broadcasting, by a DMA engine on the compute node to each of the other compute nodes upon entering the barrier operation, a barrier control packet; receiving, by the DMA engine from each of the other compute nodes, a barrier control packet; modifying, by the DMA engine, the value for the barrier counter in dependence upon each of the received barrier control packets; exiting the barrier operation if the value for the barrier counter matches the exit value.

18 Claims, 8 Drawing Sheets

U.S. PATENT DOCUMENTS

| | | | |
|---|---|---|---|
| 6,633,937 | B2 | 10/2003 | Thomson |
| 6,775,703 | B1 | 8/2004 | Burns et al. |
| 6,839,829 | B1 | 1/2005 | Daruwalla et al. |
| 7,032,224 | B2 | 4/2006 | Kadakia et al. |
| 7,509,244 | B1 | 3/2009 | Shakeri et al. |
| 7,527,558 | B2 | 5/2009 | Lavoie et al. |
| 2002/0065930 | A1 | 5/2002 | Rhodes |
| 2003/0021287 | A1 | 1/2003 | Lee et al. |
| 2004/0111398 | A1 | 6/2004 | England et al. |
| 2006/0203739 | A1 | 9/2006 | Padmanabhan et al. |
| 2007/0179760 | A1 | 8/2007 | Smith |
| 2008/0109569 | A1* | 5/2008 | Leonard et al. .............. 710/22 |
| 2008/0240115 | A1 | 10/2008 | Briscoe et al. |
| 2009/0003344 | A1 | 1/2009 | Kumar |

OTHER PUBLICATIONS

Notice of Allowance Dated Apr. 6, 2010 in U.S. Appl. No. 11/531,846.
Final Office Action Dated Apr. 29, 2010 in U.S. Appl. No. 11/553,040.
Office Action Dated Jul. 12, 2010 in U.S. Appl. No. 11/764,282.
Office Action Dated May 3, 2010 in U.S. Appl. No. 12/180,963.
Nenad Stankovic Kang Zhang, Visual Programming for Message-Passing Systems (1999), International Journal of Software Engineering and Knowledge Engineering.
Matthew J. Sottile, Vaddadi P. Chandu, David A. Bader, Performance analysis of parallel programs via message-passing graph traversal, College of Computing, Georgia Institute of Technology, Feb. 25, 2006.
Office Action, U.S. Appl. No. 11/946,934, mail date Nov. 24, 2010.
Office Action, U.S. Appl. No. 11/924,934, mail date Aug. 19, 2010.
Notice of Allowance, U.S. Appl. No. 11/764,282, mail date Dec. 10, 2010.
Office Action, U.S. Appl. No. 11/832,192, mail date Oct. 29, 2010.
Office Action, U.S. Appl. No. 12/166,748, mail date May 27, 2010.
Office Action, U.S. Appl. No. 12/166,748, mail date Aug. 25, 2010.
Notice of Allowance, U.S. Appl. No. 12/180,963, mail date Oct. 20, 2010.
University of Minnesota Super Computing Institute. 2009. Derived Data Types with MPI.
William Saphir, Message Buffering and it's Effect on the Communications Performance on Parallel Computers. Apr. 1994.
University of Minnesota Super Computing Institute. 2009 MPI Performance Topics.
Final Office Action, 11/865,981, mail date Jul. 22, 2011.
"MPI-2: Extensions to the Message-Passing Interface," Forum, Nov. 15, 2003.
Final Office Action, U.S. Appl. No. 12/166,748, mail date Mar. 7, 2011.
Final Office Action, U.S. Appl. No. 11/832,192, mail date Apr. 13, 2011.
Office Action, U.S. Appl. No. 11/764,333, mail date Apr. 13, 2011.
Final Office Action, U.S. Appl. No. 11/924,934, mail date Feb. 24, 2011.
Notice of Allowance, U.S. Appl. No. 11/946,136, mail date Mar. 4, 2011.
Office Action, U.S. Appl. No. 11/865,921, mail date Feb. 2, 2011.

* cited by examiner

DETERMINING WHEN A SET OF COMPUTE NODES PARTICIPATING IN A BARRIER OPERATION ON A PARALLEL COMPUTER ARE READY TO EXIT THE BARRIER OPERATION

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for determining when a set of compute nodes participating in a barrier operation on a parallel computer are ready to exit the barrier operation.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather operation.

As mentioned above, compute nodes connected through such data communications operate to processes parallel applications. Each compute node typically processes its own set of data according to a parallel algorithm specified by the parallel application. Because each compute node processes data independently, some compute nodes may process instructions faster or slower than other compute nodes. The compute nodes that process instructions faster than other compute nodes tend to be processing data according to the parallel algorithm at a point further along than the other compute nodes. The compute nodes that process instructions slower than other compute nodes tend to be processing data according to the parallel algorithm at a point behind the other compute nodes. Because a particular portion of a parallel algorithm often requires that all of the compute nodes begin processing the particular portion at the same time, such a parallel algorithm may specify that all of the compute nodes be synchronized before processing that particular portion of the algorithm. To synchronize a set of compute nodes, software designers often use a barrier operation. A barrier operation for a set of compute nodes prevents each compute node from processing beyond a particular point in a parallel algorithm until all of the other compute nodes reach the same point in the algorithm. A barrier operation may be implemented using, for example, the MPI_BARRIER function described in the Message Passing Interface ('MPI') specification that is promulgated by the MPI Forum. Because a barrier operation forces most of the compute nodes in a particular set to wait for the slowest compute nodes before processing of the parallel algorithm may continue, computer architects often attempt to design systems such that a set of compute nodes may exit a barrier operation as fast as possible. As such, readers will appreciate any improvements in determining when a set of compute nodes participating in a barrier operation on a parallel computer are ready to exit the barrier operation.

SUMMARY OF THE INVENTION

Methods, apparatus, and products are disclosed for determining when a set of compute nodes participating in a barrier operation on a parallel computer are ready to exit the barrier operation that include, for each compute node in the set of compute nodes: initializing, by the compute node, a barrier counter with no counter underflow interrupt; configuring, by the compute node upon entering the barrier operation, the barrier counter with a value in dependence upon a number of compute nodes in the set of compute nodes; broadcasting, by a Direct Memory Access ('DMA') engine on the compute node to each of the other compute nodes in the set upon entering the barrier operation, a barrier control packet; receiving, by the DMA engine on the compute node from each of the other compute nodes in the set, a barrier control packet sent in response to each of the other compute nodes entering the barrier operation; modifying, by the DMA engine for the compute node, the value for the barrier counter in dependence upon each of the received barrier control packets; determining, by the DMA engine for the compute node, whether the value for the barrier counter matches an exit value; and exiting, by the compute node, the barrier operation if the value for the barrier counter matches the exit value.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
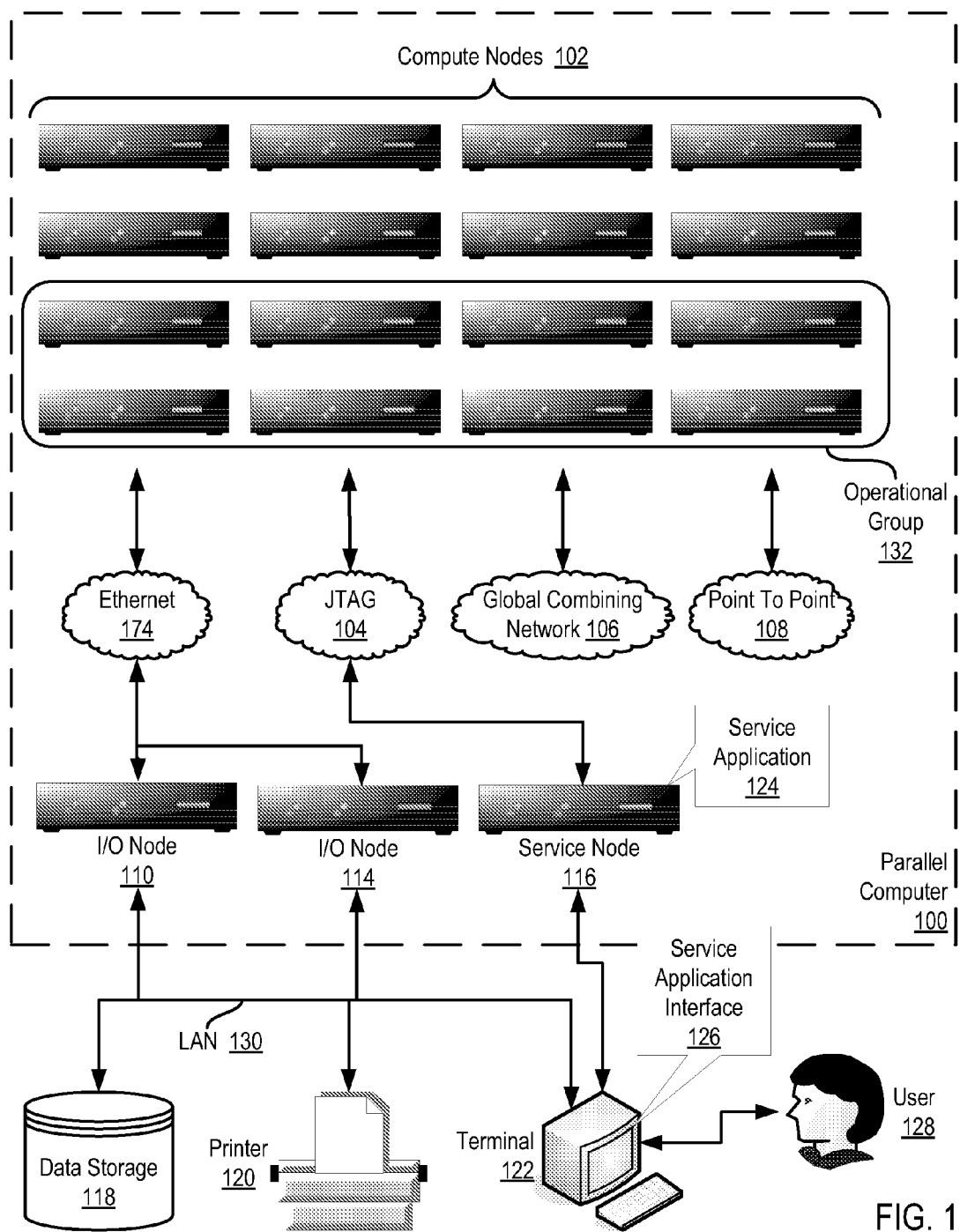
FIG. 1 illustrates an exemplary system for determining when a set of compute nodes participating in a barrier operation on a parallel computer are ready to exit the barrier operation according to embodiments of the present invention.

Exemplary methods, apparatus, and computer program products for determining when a set of compute nodes participating in a barrier operation on a parallel computer are ready to exit the barrier operation according to embodiments of the present invention are described with reference to the accompanying drawings, beginning with FIG. 1. FIG. 1 illustrates an exemplary system for determining when a set of compute nodes participating in a barrier operation on a parallel computer are ready to exit the barrier operation according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount * N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). The parallel computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for determining when a set of compute nodes participating in a barrier operation on a parallel computer are ready to exit the barrier operation according to embodiments of the present invention. The system of FIG. 1 operates generally for determining when a set of compute nodes participating in a barrier operation on a parallel computer are ready to exit the barrier operation according to embodiments of the present invention as follows: Each compute node in a set of compute nodes initializes a barrier counter with no counter underflow interrupt. Each compute node in the set of compute nodes: configures, upon entering the barrier operation, the barrier counter with a value in dependence upon a number of compute nodes in the set of compute nodes; broadcasts, by a DMA engine on the compute node to each of the other compute nodes in the set upon entering the barrier operation, a barrier control packet; receives, by the DMA engine on the compute node from each of the other compute nodes in the set, a barrier control packet sent in response to each of the other compute nodes entering the barrier operation; modifies, by the DMA engine for the compute node, the value for the barrier counter in dependence upon each of the received barrier control packets; determines, by the compute node, whether the value for the barrier counter matches an exit value; and exiting the barrier operation if the value for the barrier counter matches the exit value.

A barrier operation is a synchronization operation for a set of compute nodes that prevents each compute node from processing beyond a particular point in a parallel algorithm until all of the other compute nodes reach the same point in the algorithm. A barrier operation that may be improved according to embodiments of the present invention may include, for example, the MPI_BARRIER function described in the MPI specification, the pvm_barrier( ) function described in the PVM specification, or any other implementation as will occur to those of skill in the art.

The arrangement of nodes, networks, and I/O devices making up the exemplary system illustrated in FIG. 1 are for explanation only, not for limitation of the present invention. Data processing systems capable of determining when a set of compute nodes participating in a barrier operation on a parallel computer are ready to exit the barrier operation according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Determining when a set of compute nodes participating in a barrier operation on a parallel computer are ready to exit the barrier operation according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of determining when a set of compute nodes participating in a barrier operation on the parallel computer are ready to exit the barrier operation according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
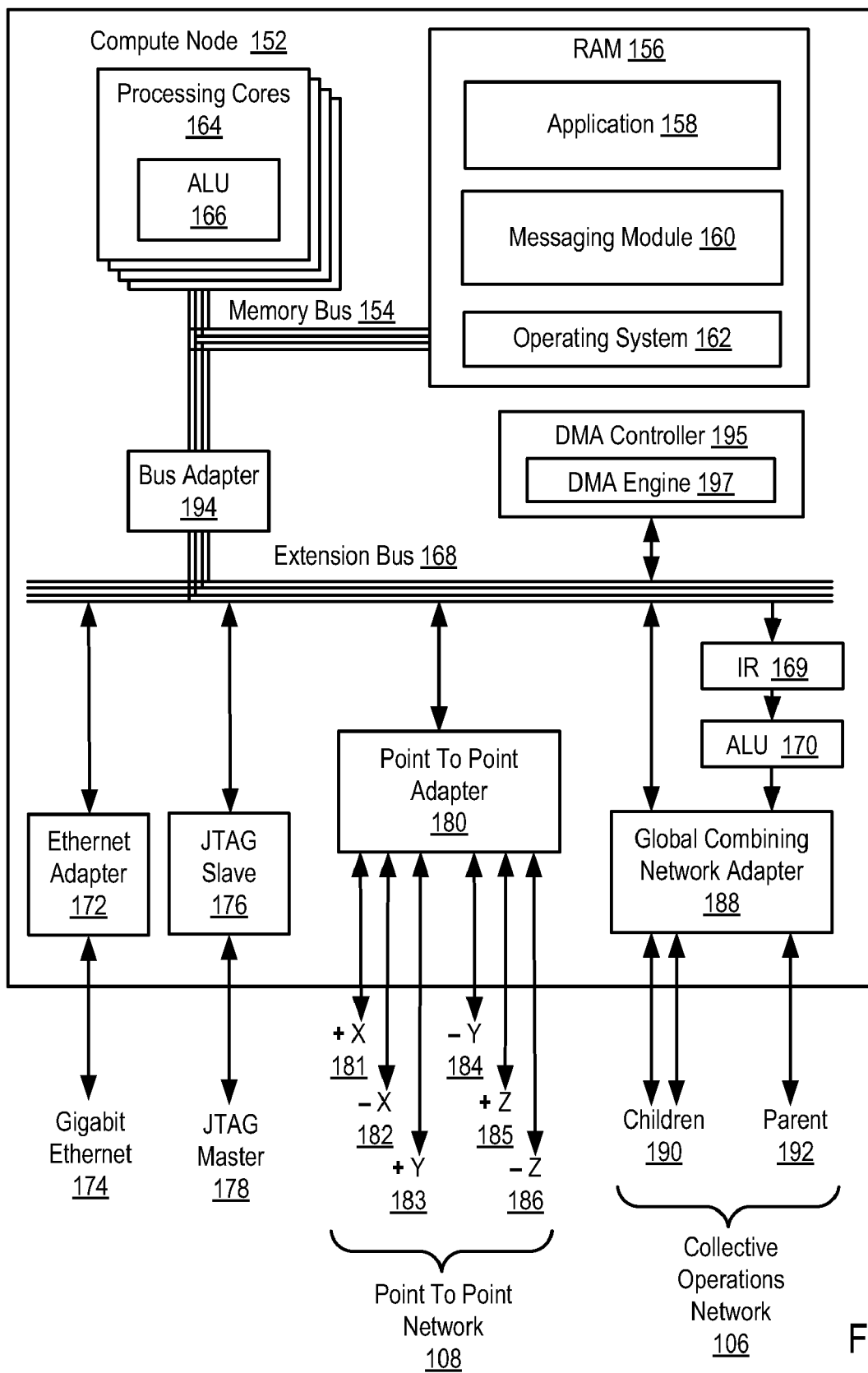
FIG. 2 sets forth a block diagram of an exemplary compute node useful in a parallel computer capable of determining when a set of compute nodes participating in a barrier operation on the parallel computer are ready to exit the barrier operation according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for determining when a set of compute nodes participating in a barrier operation on a parallel computer are ready to exit the barrier operation according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in determining when a set of compute nodes participating in a barrier operation on a parallel computer are ready to exit the barrier operation according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

As mentioned above, the compute node (152) of FIG. 2 is configured for determining when a set of compute nodes participating in a barrier operation on a parallel computer are ready to exit the barrier operation according to embodiments of the present invention. The compute node (152) of FIG. 2 operates generally for determining when a set of compute nodes participating in a barrier operation on a parallel computer are ready to exit the barrier operation according to embodiments of the present invention as follows: the compute node (152), which belongs to a set of compute nodes, initializes a barrier counter with no counter underflow interrupt. Upon entering the barrier operation, the compute node (152) configures the barrier counter with a value in dependence upon a number of compute nodes in the set of compute nodes and broadcasts, by the DMA engine (197) to each of the other compute nodes in the set, a barrier control packet. The DMA engine (197) of the compute node (152) receives, from each of the other compute nodes in the set, a barrier control packet sent in response to each of the other compute nodes entering the barrier operation and modifies the value for the barrier counter in dependence upon each of the received barrier control packets. The compute node (152) determines whether the value for the barrier counter matches an exit value and exits the barrier operation if the value for the barrier counter matches the exit value.

Figure 3A:
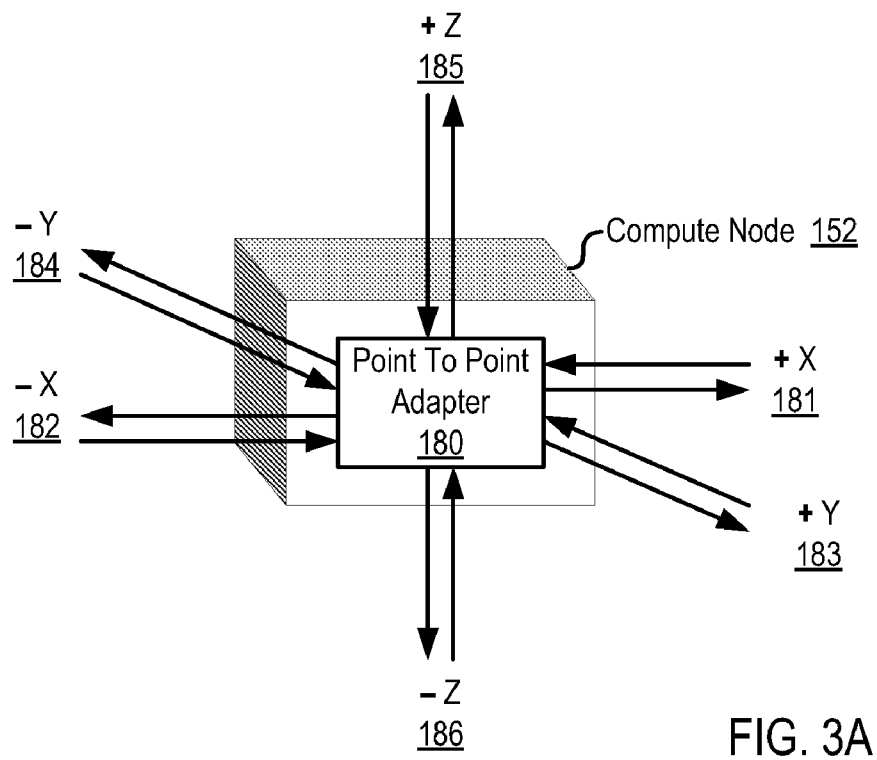
FIG. 3A illustrates an exemplary Point To Point Adapter useful in systems capable of determining when a set of compute nodes participating in a barrier operation on a parallel computer are ready to exit the barrier operation according to embodiments of the present invention.

For further explanation, FIG. 3A illustrates an exemplary Point To Point Adapter (180) useful in systems capable of determining when a set of compute nodes participating in a barrier operation on a parallel computer are ready to exit the barrier operation according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
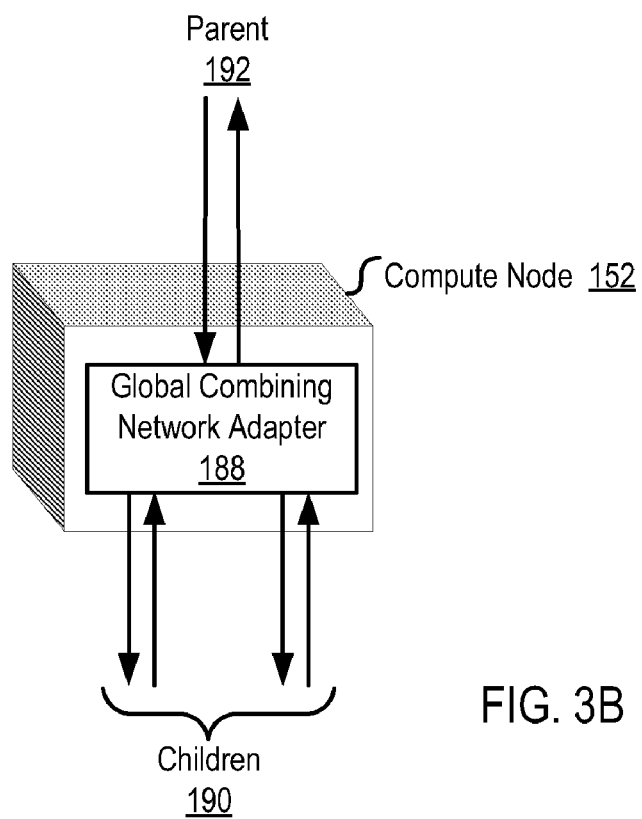
FIG. 3B illustrates an exemplary Global Combining Network Adapter useful in systems capable of determining when a set of compute nodes participating in a barrier operation on a parallel computer are ready to exit the barrier operation according to embodiments of the present invention.

For further explanation, FIG. 3B illustrates an exemplary Global Combining Network Adapter (188) useful in systems capable of determining when a set of compute nodes participating in a barrier operation on a parallel computer are ready to exit the barrier operation according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
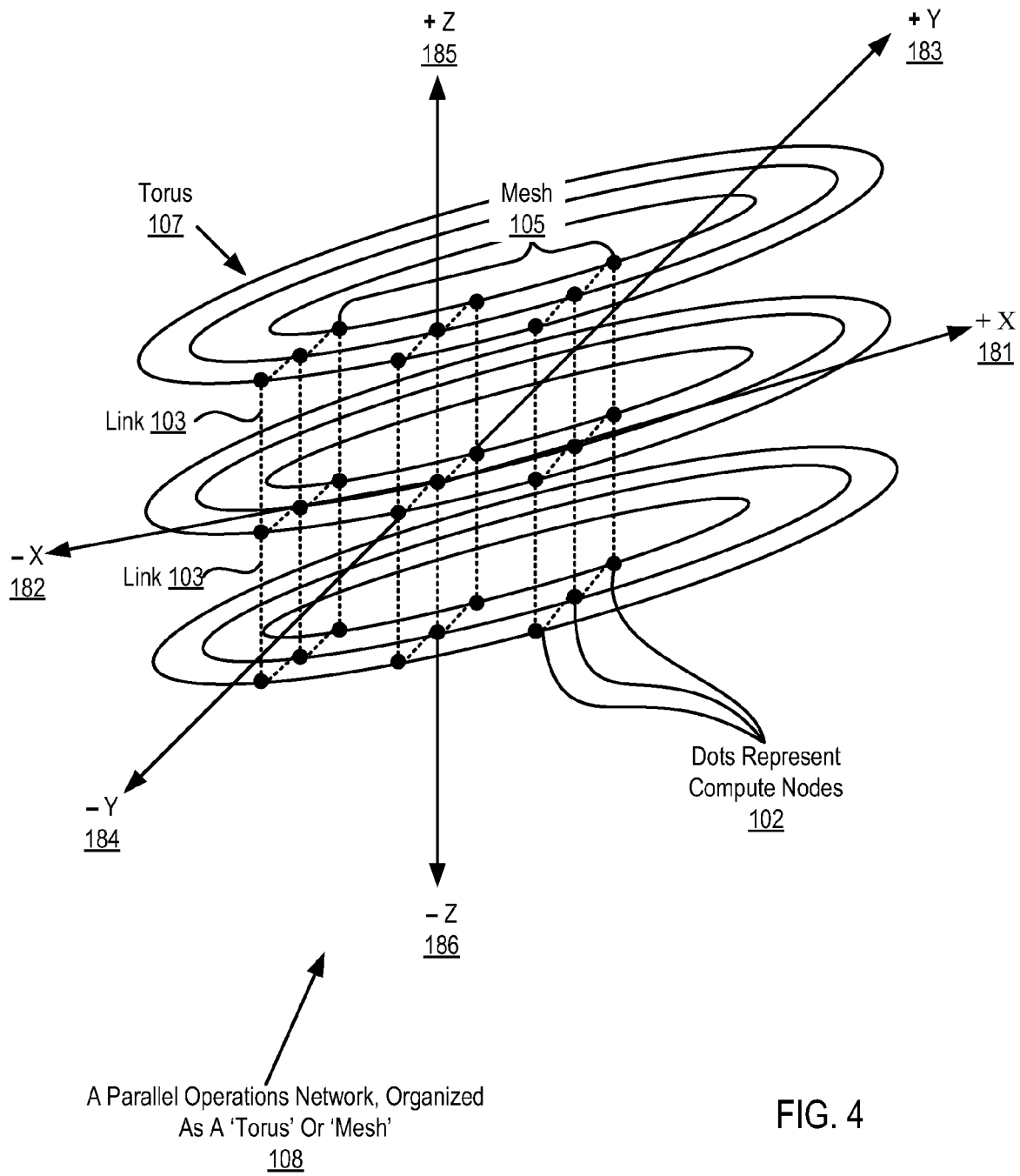
FIG. 4 sets forth a line drawing illustrating an exemplary data communications network optimized for point to point operations useful in systems capable of determining when a set of compute nodes participating in a barrier operation on a parallel computer are ready to exit the barrier operation in accordance with embodiments of the present invention.

For further explanation, FIG. 4 sets forth a line drawing illustrating an exemplary data communications network (108) optimized for point to point operations useful in systems capable of determining when a set of compute nodes participating in a barrier operation on a parallel computer are ready to exit the barrier operation in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in determining when a set of compute nodes participating in a barrier operation on a parallel computer are ready to exit the barrier operation in accordance with embodiments of the present invention may contain only a few compute nodes or may contain thousands of compute nodes.

Figure 5:
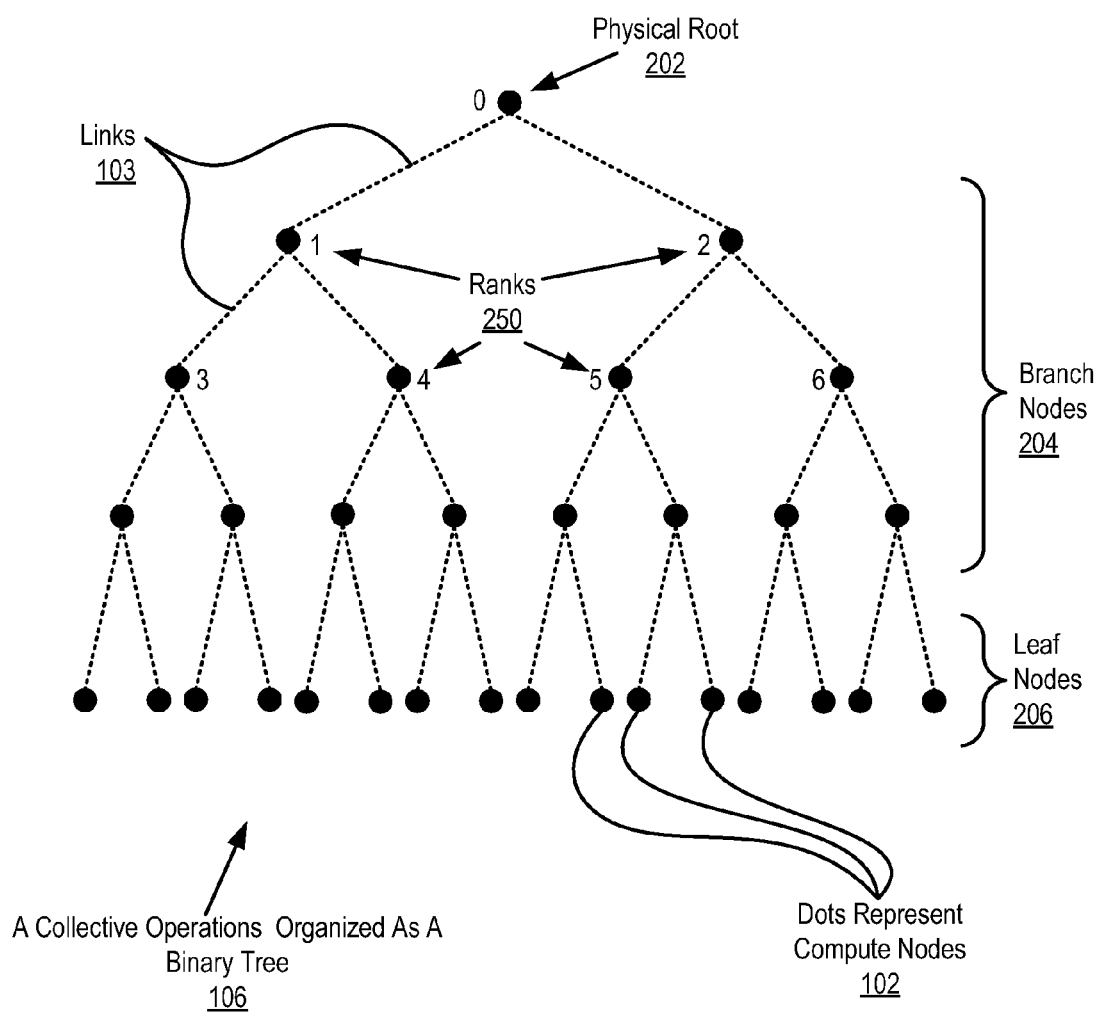
FIG. 5 sets forth a line drawing illustrating an exemplary data communications network optimized for collective operations useful in systems capable of determining when a set of compute nodes participating in a barrier operation on a parallel computer are ready to exit the barrier operation in accordance with embodiments of the present invention.

For further explanation, FIG. 5 sets forth a line drawing illustrating an exemplary data communications network (106) optimized for collective operations useful in systems capable of determining when a set of compute nodes participating in a barrier operation on a parallel computer are ready to exit the barrier operation in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for determining when a set of compute nodes participating in a barrier operation on a parallel computer are ready to exit the barrier operation accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
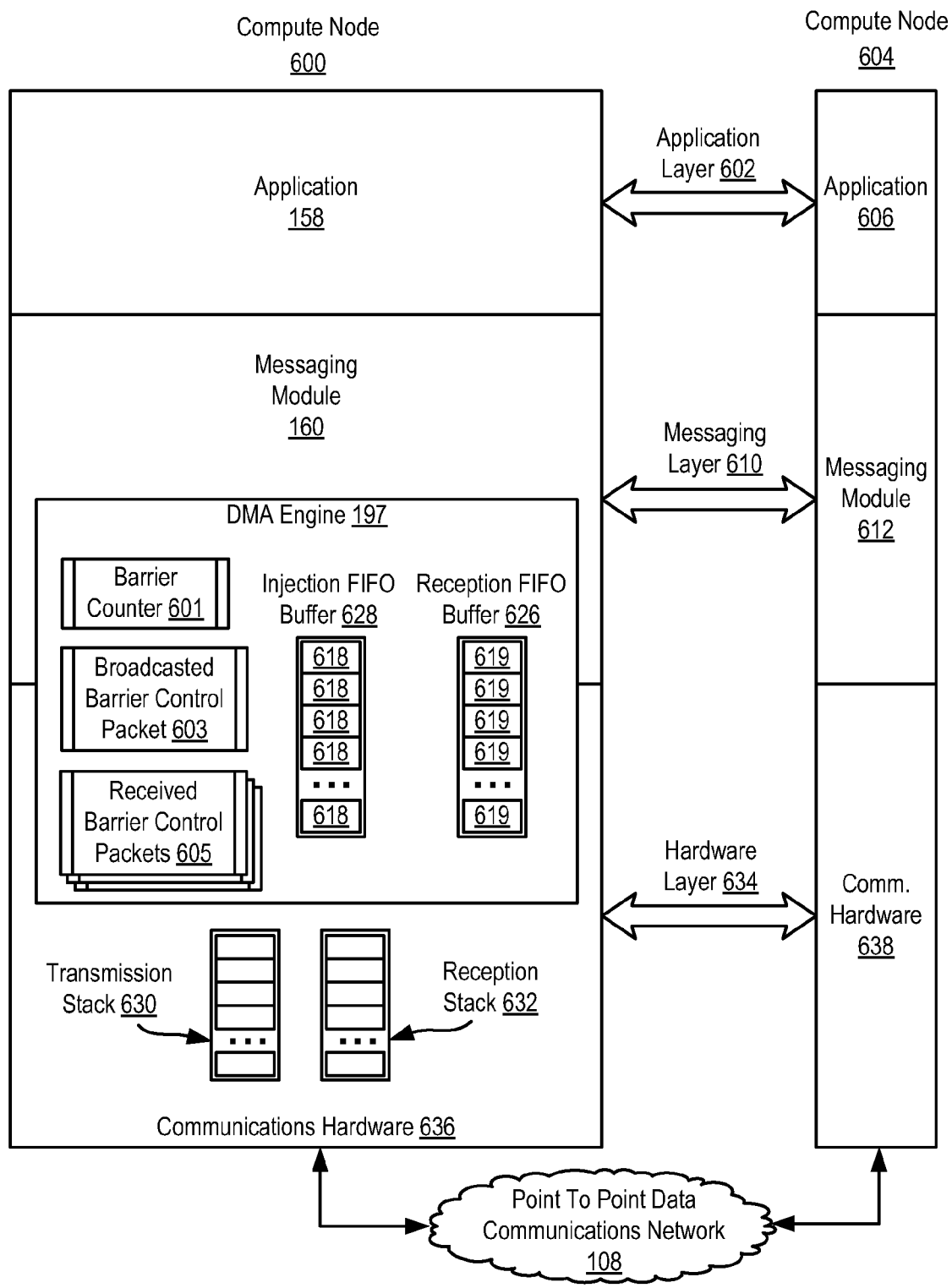
FIG. 6 sets forth a block diagram illustrating an exemplary communications architecture illustrated as a protocol stack useful in determining when a set of compute nodes participating in a barrier operation on a parallel computer are ready to exit the barrier operation according to embodiments of the present invention.

For further explanation, FIG. 6 sets forth a block diagram illustrating an exemplary communications architecture illustrated as a protocol stack useful in determining when a set of compute nodes participating in a barrier operation on a parallel computer are ready to exit the barrier operation according to embodiments of the present invention. The exemplary communications architecture of FIG. 6 sets forth two compute nodes (600, 604). Only two compute nodes are illustrated in the example of FIG. 6 for ease of explanation and not for limitation. In fact, determining when a set of compute nodes participating in a barrier operation on a parallel computer are ready to exit the barrier operation according to embodiments of the present invention may be implemented using many compute nodes in very large scale computer systems such as parallel computers with thousands of nodes.

The exemplary communications architecture of FIG. 6 includes an application layer (602) composed of an application (158) installed on the compute node (600) and an application (606) installed on the compute node (604). In the example of FIG. 6, the application (158) on the compute node (600) has an application message for transmission to the application (606) on the compute node (604). Data communications between applications (158, 606) are effected using messaging modules (160, 612) installed on each of the compute nodes (600, 604). Applications (158, 606) may communicate by invoking function of an application programming interfaces ('API') exposed by the application messaging modules (606, 612). To transmit the message to the application (606), for example, the application (158) of FIG. 6 may invoke a function of an API for messaging module (160) that passes a buffer identifier of an application buffer containing the application message to the messaging module (160).

The exemplary communications architecture of FIG. 6 includes a messaging layer (610) that implements data communications protocols for data communications that support messaging in the application layer (602). Such data communications protocols are typically invoked through a set of APIs that are exposed to the applications (158 and 606) in the application layer (602). In the example of FIG. 6, the messaging layer (610) is composed of messaging module (160) installed on the compute node (600) and messaging module (612) installed on the compute node (604).

The exemplary communications architecture of FIG. 6 includes a hardware layer (634) that defines the physical implementation and the electrical implementation of aspects of the hardware on the compute nodes such as the bus, network cabling, connector types, physical data rates, data transmission encoding and may other factors for communications between the compute nodes (600 and 604) on the physical network medium. The hardware layer (634) of FIG. 6 is composed of communications hardware (636) of the compute node (600), communications hardware (638) of the compute node (636), and the data communications network (108) connecting the compute node (600) to the compute node (604). Such communications hardware may include, for example, point-to-point adapters and DMA controllers as described above with reference to FIGS. 2 and 3A. In the example of FIG. 6, the communications hardware (636) includes a transmission stack (630) for storing network packets for transmission to other communications hardware through the data communications network (108) and includes a reception stack (632) for storing network packets received from other communications hardware through the data communications network (108).

The exemplary communications architecture of FIG. 6 illustrates a DMA engine (197) for the compute node (600). The DMA engine (197) in the example of FIG. 6 is illustrated in both the messaging module layer (610) and the hardware layer (634). The DMA engine (197) is shown in both the messaging layer (610) and the hardware layer (634) because a DMA engine useful in determining when a set of compute nodes participating in a barrier operation on a parallel computer are ready to exit the barrier operation according to embodiments of the present invention may often provide messaging layer interfaces and also implement communications according to some aspects of the communication hardware layer (634). The exemplary DMA engine (197) of FIG. 6 includes an injection first-in-first-out ('FIFO') buffer (628) for storing data descriptors (618) that specify DMA transfer operations for transferring data. The exemplary DMA engine (197) of FIG. 6 also includes a reception FIFO buffer (626) used to receive message packets (619) from other DMA engines on other compute nodes. Although FIG. 6 only illustrates a single injection FIFO buffer (628) and a single reception FIFO buffer (626), readers will note that a DMA engine may have access to any number of injection FIFO buffers and reception FIFO buffers.

In the example of FIG. 6, the compute node (600) is configured to determine when a set of compute nodes participating in a barrier operation on a parallel computer are ready to exit the barrier operation according to embodiments of the present invention. The compute node (600) of FIG. 6 operates generally for determining when a set of compute nodes participating in a barrier operation on a parallel computer are ready to exit the barrier operation according to embodiments of the present invention as follows: The compute node (600), which belongs to a set of compute nodes (600, 604), initializes a barrier counter (601) with no counter underflow interrupt. Upon entering the barrier operation, the compute node (600) configures the barrier counter (601) with a value in dependence upon a number of compute nodes (600, 604) in the set of compute nodes and broadcasts, by the DMA engine (197) to each of the other compute nodes (604) in the set, a barrier control packet (603). The DMA engine (197) of the compute node (600) receives, from each of the other compute nodes (604) in the set, a barrier control packet (605) sent in response to each of the other compute nodes (604) entering the barrier operation and modifies the value for the barrier counter (601) in dependence upon each of the received barrier control packets (605). The DMA engine (197) of the compute node (152) then determines whether the value for the barrier counter (601) matches an exit value and exits the barrier operation if the value for the barrier counter (601) matches the exit value.

As mentioned above, the barrier counter (601) of FIG. 6 does not have a counter underflow interrupt. A counter underflow interrupt is an interrupt that is triggered when the value of the counter (601) is set to a negative number. The barrier counter (601) of FIG. 6 does not have a counter underflow interrupt in an effort to allow the barrier counter (601) to store negative numbers without interrupting the processing core. As discussed in further detail below, in some embodiments of the present invention, storing negative numbers in the barrier counter (601) without interrupting the compute node's processing core allows the compute node (600) to determine when a set of compute nodes participating in a barrier operation on a parallel computer are ready to exit the barrier operation.

Figure 7:
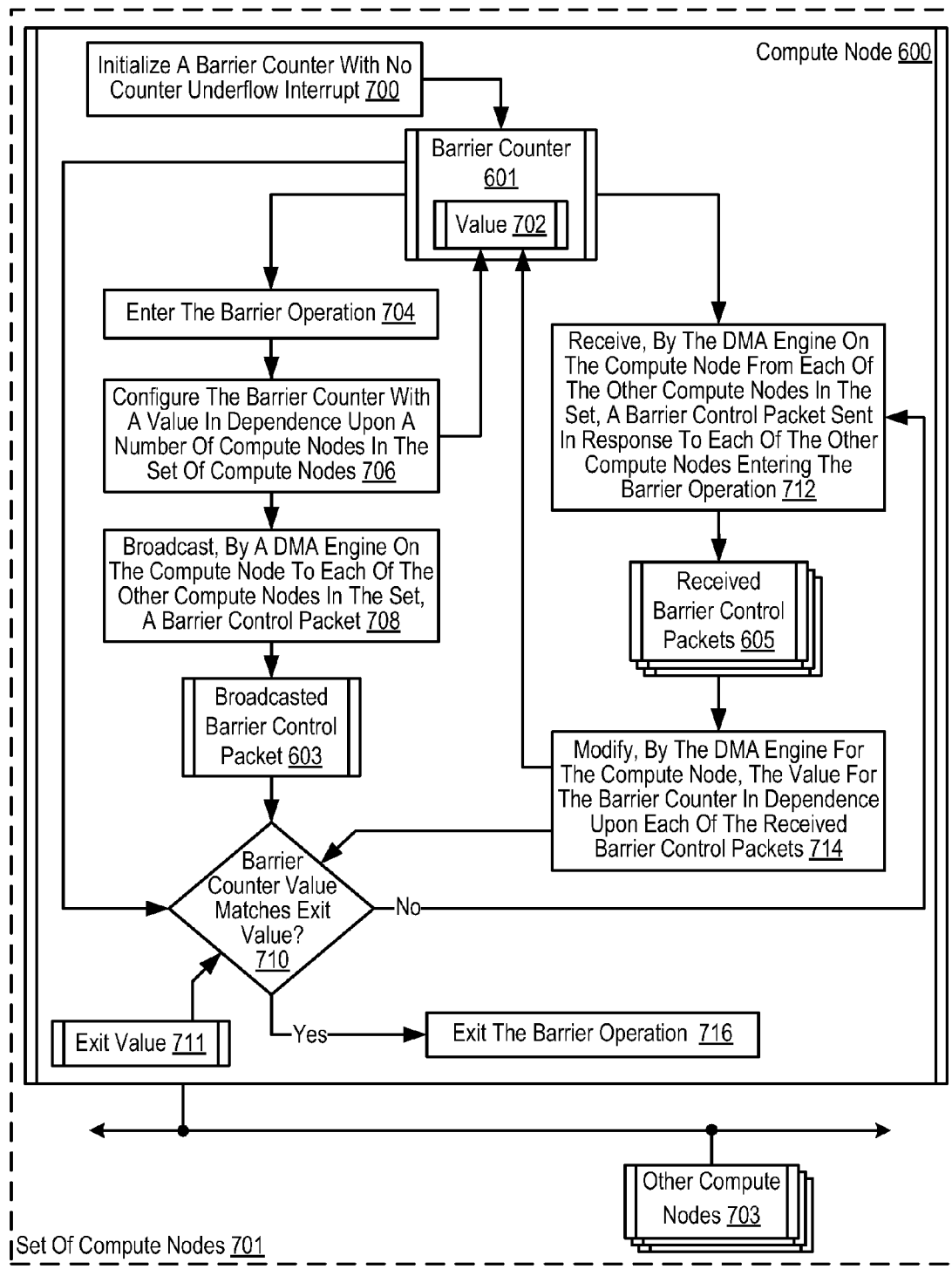
FIG. 7 sets forth a flow chart illustrating an exemplary method for determining when a set of compute nodes participating in a barrier operation on a parallel computer are ready to exit the barrier operation according to the present invention.

For further explanation, FIG. 7 sets forth a flow chart illustrating an exemplary method for determining when a set (701) of compute nodes (600, 703) participating in a barrier operation on a parallel computer are ready to exit the barrier operation according to the present invention. In the example of FIG. 7, the compute nodes (600, 703) in the set (701) are configured along a same axis of a network topology for the parallel computer. For example, consider that the compute nodes of a parallel computer are connected for data communications through a network organized as a three-dimensional rectangular mesh having an X-axis, a Y-axis, and a Z-axis. In such an example, the compute nodes (600, 703) in the set (701) may be configured along an X-axis such that the values of the X-coordinate for each of the compute nodes (600, 703) are the same.

The method of FIG. 7 includes initializing (700), for the compute node (600) in the set (701) of compute nodes, a barrier counter (601) with no counter underflow interrupt. The barrier counter (601) of FIG. 7 is a DMA counter that tracks the number of barrier control packets (605) received from the other compute nodes (703) in the set (701) of compute nodes. A counter underflow interrupt is an interrupt that is triggered when the value of the counter (601) is set to a negative number. The barrier counter (601) of FIG. 6 does not have a counter underflow interrupt in an effort to allow the barrier counter (601) to store negative numbers without interrupting the processing core, thereby reducing processing overhead when determining when a set of compute nodes participating in a barrier operation on a parallel computer are ready to exit the barrier operation according to some embodiments of the present invention. The compute node (600) may initialize (700) the barrier counter (601) with no counter underflow interrupt according to the method of FIG. 7 by storing zero as the value (702) of the barrier counter (601).

The method of FIG. 7 also includes entering (704), by the compute node (600), the barrier operation. The compute node (600) may enter (704) the barrier operation by calling a barrier operation function of a parallel communications library, or messaging module, as specified by a parallel algorithm. For example, consider the following exemplary segment of a parallel algorithm:

1: . . .
2: MPI_Recv( );
3: MPI_Barrier( );
4: MPI_Finalize( );
5: exit( );

In the exemplary parallel algorithm segment above, a compute node enters the barrier operation upon calling the 'MPI_Barrier( )' function specified in line 3. In the exemplary parallel algorithm segment above, the 'MPI_Barrier( )' function is a function of an MPI library that is improved for determining when a set of compute nodes participating in a barrier operation on a parallel computer are ready to exit the barrier operation according to embodiments of the present invention. Readers will note that the exemplary parallel algorithm segment depicted above is for explanation only and not for limitation.

The method of FIG. 7 also includes configuring (706), by the compute node (600) upon entering the barrier operation, the barrier counter (601) with a value (702) in dependence upon a number of compute nodes in the set (701) of compute nodes. The compute node (600) may configure (706) the barrier counter (601) with a value (702) according to the method of FIG. 7 by incrementing the value (702) of the barrier counter (601) by the number of compute nodes in the set (701) minus one. For example, consider that the set (701) of compute nodes includes four compute nodes. In such an example, the compute node (600) may configure (706) the barrier counter (601) with a value (702) of three, which is the number of compute nodes in the set minus one.

The method of FIG. 7 includes broadcasting (708), by a DMA engine on the compute node (600) to each of the other compute nodes (703) in the set (701) upon entering (704) the barrier operation, a barrier control packet (603). A barrier control packet (603) of FIG. 7 that is broadcast to the other compute nodes (703) is a network packet that notifies the DMA engines in the other compute nodes (703) that the compute node (600) has entered (704) the barrier operation. The manner in which the compute node (600) broadcasts (708) the barrier control packet (603) may depend on the network topology for the data communications network connecting the compute nodes of a parallel compute node. For example, if the network topology is a torus network and the all the compute nodes are configured along a same axis of the torus topology for the parallel computer, then the compute node (600) may broadcast (708) the barrier control packet (603) according to the method of FIG. 7 by transmitting a barrier control packet (603) along one direction of the axis with a 'deposit bit' set. Transmitting the barrier control packet (603) with a 'deposit bit' set instructs the routing hardware for each compute node receiving the packet to place a copy of the packet in the compute node's reception FIFO buffers and forward the packet along to the next compute node along the axis. Because the network topology is a torus topology having wrap-around links, transmitting a barrier control packet (603) along one direction of the axis will reach each compute node on the axis. In other embodiments, if the network topology is a rectangular mesh network and the all the compute nodes are configured along a same axis of the rectangular mesh topology for the parallel computer, then the compute node (600) may broadcast (708) the barrier control packet (603) according to the method of FIG. 7 by transmitting two barrier control packets (603) along the axis, each barrier control packet (603) transmitted along one direction of the axis with a 'deposit bit' set.

Regardless of when the compute node (600) enters (704) the barrier operation, the method of FIG. 7 also includes receiving (712), by the DMA engine on the compute node (600) from each of the other compute nodes in the set (701), a barrier control packet (605) sent in response to each of the other compute nodes (703) entering (704) the barrier operation. The DMA engine on the compute node (600) may receive (712) a barrier control packet (605) from each of the other compute nodes (600) in the set (701) according to the method of FIG. 7 by receiving a barrier control packet (605) that specifies a remote get data transfer operation for retrieving a predetermined amount of data from the compute node (600) and specifies using the barrier counter (601) on the compute node (600) for tracking the data transfer. A remote get operation is a DMA control operation that allows a compute node to retrieve data from another compute node without involving the processor on the compute node providing the data by injecting a data descriptor into the other compute node's DMA FIFO buffers. To track when the data transfer is complete, both compute nodes decrement their respective DMA counters by the number of bytes transferred. In the example of FIG. 7, each of the received barrier control packets (605) specifies transferring one byte of data from the compute node (600) so that the barrier counter (601) is decremented by a value of one for each received barrier control packet (605).

The method of FIG. 7 includes modifying (714), by the DMA engine for the compute node (600), the value (702) for the barrier counter (601) in dependence upon each of the received barrier control packets (605). The DMA engine for the compute node (600) may modify (714) the value (702) for the barrier counter (601) in dependence upon each of the received barrier control packets (605) according to the method of FIG. 7 by decrementing the value (702) of the barrier counter (601) by one. As mentioned above, the DMA engine of the compute node decrements the value (702) of the barrier counter (601) by a value of one because the barrier control packets (605) received from each of the other compute nodes (703) specify transferring one byte of data from the compute node (600).

The method of FIG. 7 also includes determining (710), by the DMA engine for the compute node (600), whether the value (702) for the barrier counter (601) matches an exit value (711). Although any value as will occur to those of skill in the art may be used as the exit value (711), the exit value (711) in the example of FIG. 7 is zero. Readers will note that regardless of the exit value (711) used, the values by which the barrier counter (601) is incremented or decremented upon entry into the barrier operation and upon the receipt of barrier control packets (605) should be chosen such that after the compute node (600) has entered (704) the barrier operation and the barrier control packets (605) have been received from all other compute nodes (703) in the set (701) that the value (702) of the barrier counter (601) matches the exit value (711). In the method of FIG. 7, the DMA engine for the compute node (600) may determine (710) whether the value (702) for the barrier counter (601) matches an exit value (711) by identifying whether the value (702) of the barrier counter (601) is equal to the exit value (711). If the value (702) of the barrier counter (601) is equal to the exit value (711), then the value (702) for the barrier counter (601) matches the exit value (711). The value (702) for the barrier counter (601) does not match the exit value (711), however, if the value (702) of the barrier counter (601) is not equal to the exit value (711).

In the method of FIG. 7, the compute node (600) continues to receive (712) a barrier control packet (605) from each of the other compute node (703) if the value (702) for the barrier counter (601) does not match the exit value (711). Having a value (702) for the barrier counter (601) that does not match the exit value (711) indicates that the compute node (600) has not received barrier control packets (605) from all of the other compute nodes (703), thereby further indicating that not all of the other compute nodes (703) have entered the barrier operation.

The method of FIG. 7 also includes exiting (716), by the compute node (600), the barrier operation if the value (702) for the barrier counter (601) matches the exit value (711). Having a value (702) for the barrier counter (601) that matches the exit value (711) indicates that the compute node (600) and all of the other compute nodes (703) have entered the barrier operation. The compute node (600) may exit (716) the barrier operation according to the method of FIG. 7 by configuring the DMA engine of the compute node (600) to trigger an interrupt when the barrier counter (601) reaches the exit value (711) in order to notify a processing core on the compute node that all the compute node (600, 703) in the set (701) of compute nodes have entered the barrier operation and configuring the processing core to resume processing of the parallel algorithm at a barrier exit point specified by the algorithm. As mentioned above, in the example of FIG. 7, the exit value (711) is zero. As such, the compute node (600) may configure the DMA engine on the compute node (600) to trigger an interrupt upon reaching a value of zero. For further explanation of configuring the processing core to resume processing of the parallel algorithm at a barrier exit point specified by the algorithm, consider again the following segment of an exemplary parallel algorithm:

1: . . .
2: MPI-Recv( );
3: MPI_Barrier( );
4: MPI_Finalize( );
5: exit( );

As mentioned above, a compute node enters the barrier operation upon calling the 'MPI_Barrier( )' function specified in line 3 in the exemplary parallel algorithm segment above. In the exemplary parallel algorithm segment above, the barrier exit point is at line 4, the point specified by the exemplary parallel algorithm for the processing core to resume processing upon completion of the barrier operation. Readers will note that the exemplary parallel algorithm segment depicted above is for explanation only and not for limitation.

Although FIG. 7 is discussed with reference to the compute node (600) in the set (701) of compute nodes (600, 703), readers will note that all of the compute nodes (600, 703) in the set (701) operate for determining when a set of compute nodes participating in a barrier operation on a parallel computer are ready to exit the barrier operation according to embodiments of the present invention. That is, each compute node (600, 703) initializes a barrier counter with no counter underflow interrupt. Moreover, for each compute node (600, 703) in the set (701) of compute nodes, each compute node: configures, by the compute node upon entering the barrier operation, the barrier counter with a value in dependence upon a number of compute nodes in the set of compute nodes; broadcasts, by a DMA engine on the compute node to each of the other compute nodes in the set upon entering the barrier operation, a barrier control packet; receives, by the DMA engine on the compute node from each of the other compute nodes in the set (701), a barrier control packet sent in response to each of the other compute nodes entering the barrier operation; modifies, by the DMA engine for the compute node, the value for the barrier counter in dependence upon each of the received barrier control packets; determines, by the DMA engine for the compute node, whether the value for the barrier counter matches an exit value; and exits, by the compute node, the barrier operation if the value for the barrier counter matches the exit value.

Figure 8:
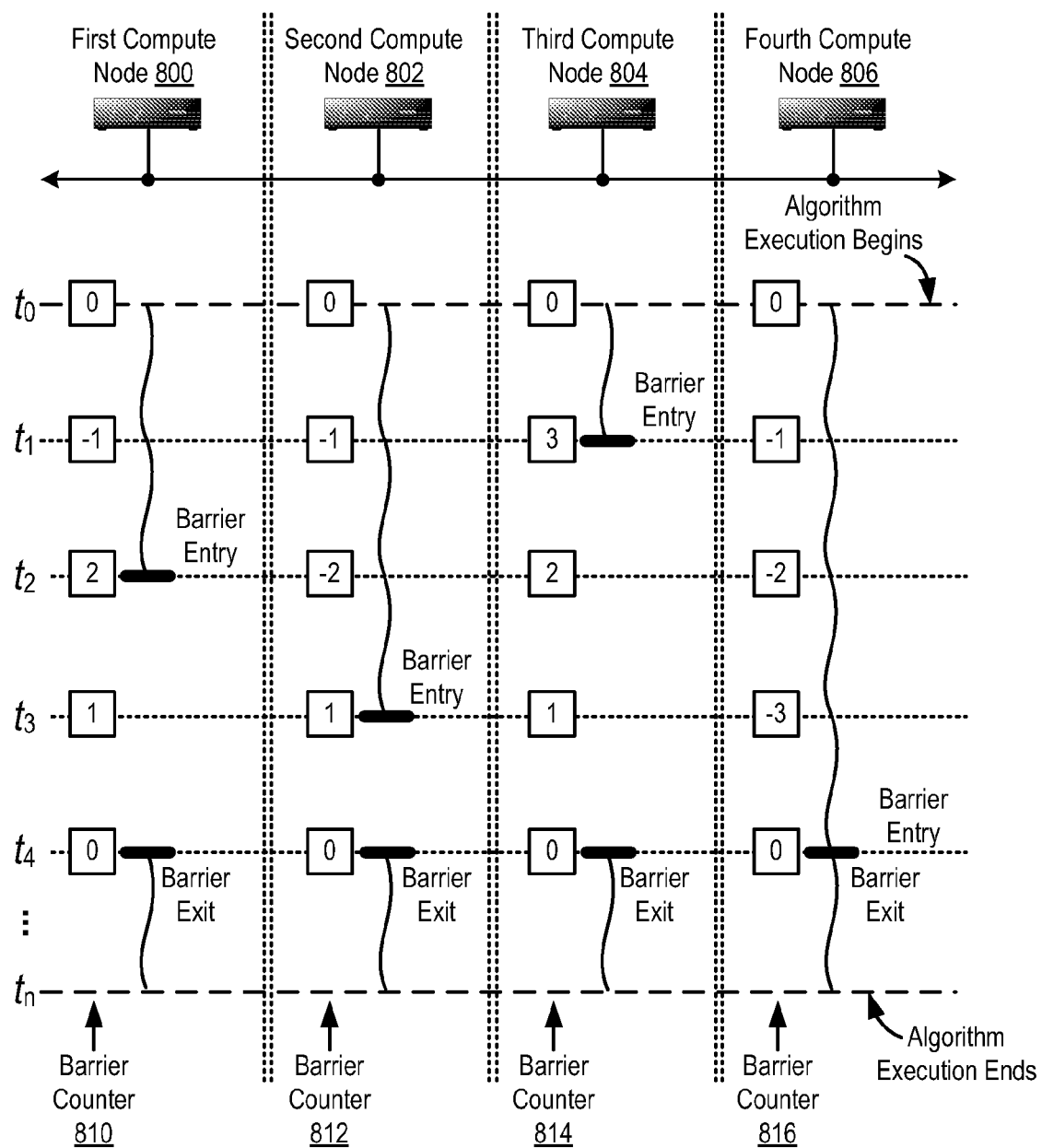
FIG. 8 sets forth a time sequence diagram illustrating an exemplary time sequence in which determining when a set of compute nodes participating in a barrier operation on a parallel computer are ready to exit the barrier operation according to the present invention is carried out.

FIG. 8 sets forth a time sequence diagram illustrating an exemplary time sequence in which determining when a set of compute nodes participating in a barrier operation on a parallel computer are ready to exit the barrier operation according to the present invention is carried out. The example of FIG. 8 includes a set of four compute nodes (800, 802, 804, 806) for a parallel computer. The compute nodes (800, 802, 804, 806) in the set are configured along the same axis of a network topology for the parallel computer. Each compute node (800, 802, 804, 806) includes a barrier counter with no counter underflow interrupt for use in determining when a set of compute nodes (800, 802, 804, 806) participating in a barrier operation on a parallel computer are ready to exit the barrier operation according to embodiments of the present invention. The first compute node (800) includes a barrier counter (810). The second compute node (802) includes a barrier counter (812). The third compute node (804) includes a barrier counter (814). The fourth compute node (806) includes a barrier counter (816).

In the example of FIG. 8, each of the compute nodes begins executing a parallel algorithm at to and ends executing the parallel algorithm at $t_n$. At $t_0$, the compute nodes (800, 802, 804, 806) initialize their respective barrier counters to a value of zero. At $t_1$, the third compute node (804) enters the barrier operation. Upon entering the barrier operation, the third compute node (804) increments its barrier counter (814) with a value of three and broadcasts a barrier control packet to each of the other compute nodes (800, 802, 806) in the set. The third compute node (804) increments the barrier counter (814) with a value of three because three is the value of the total number of compute nodes in the set minus one. The barrier control packet that the third compute node (804) broadcasts to each of the other compute nodes (800, 802, 806) specifies a remote get data transfer of one byte of data. As such, upon receiving the barrier control packet from the third compute node (804), each of the other compute nodes (800, 802, 806) decrements the value of their barrier counters by one. Immediately after $t_1$, therefore, the value for the first node's barrier counter (810) is '−1,' the value for the second node's barrier counter (812) is '−1,' the value for the third node's barrier counter (814) is '3,' and the value for the fourth node's barrier counter (816) is '−1.' Each node (800, 802, 804, 806) then determines whether their respective barrier counter value matches an exit value of zero. Because none of the barrier counter values match an exit value of zero, none of the compute nodes (800, 802, 804, 806) exit the barrier operation.

At $t_2$, the first compute node (800) enters the barrier operation. Upon entering the barrier operation, the first compute node (800) increments its barrier counter (810) with a value of three and broadcasts a barrier control packet to each of the other compute nodes (802, 804, 806) in the set. Again, the first compute node (800) increments the barrier counter (810) with a value of three because three is the value of the total number of compute nodes in the set minus one. Also, the barrier control packet that the first compute node (800) broadcasts to each of the other compute nodes (802, 804, 806) specifies a remote get data transfer of one byte of data. As such, upon receiving the barrier control packet from the first compute node (800), each of the other compute nodes (802, 804, 806) decrements the value of their barrier counters by one. Immediately after $t_2$, therefore, the value for the first node's barrier counter (810) is '2,' the value for the second node's barrier counter (812) is '−2,' the value for the third node's barrier counter (814) is '2,' and the value for the fourth node's barrier counter (816) is '−2.' Each node (800, 802, 804, 806) then determines whether their respective barrier counter value matches the exit value of zero. Because none of the barrier counter values match an exit value of zero, none of the compute nodes (800, 802, 804, 806) exit the barrier operation.

At $t_3$, the second compute node (802) enters the barrier operation. Upon entering the barrier operation, the second compute node (802) increments its barrier counter (812) with a value of three and broadcasts a barrier control packet to each of the other compute nodes (800, 804, 806) in the set. Again, the second compute node (800) increments the barrier counter (812) with a value of three because three is the value of the total number of compute nodes in the set minus one. Also, the barrier control packet that the second compute node (802) broadcasts to each of the other compute nodes (800, 804, 806) specifies a remote get data transfer of one byte of data. As such, upon receiving the barrier control packet from the second compute node (802), each of the other compute nodes (800, 804, 806) decrements the value of their barrier counters by one. Immediately after $t_3$, therefore, the value for the first node's barrier counter (810) is '1,' the value for the second node's barrier counter (812) is '1,' the value for the third node's barrier counter (814) is '1,' and the value for the fourth node's barrier counter (816) is '-3.' Each node (800, 802, 804, 806) then determines whether their respective barrier counter value matches the exit value of zero. Because none of the barrier counter values match an exit value of zero, none of the compute nodes (800, 802, 804, 806) exit the barrier operation.

At $t_4$, the fourth compute node (806) enters the barrier operation. Upon entering the barrier operation, the fourth compute node (806) increments its barrier counter (816) with a value of three and broadcasts a barrier control packet to each of the other compute nodes (800, 802, 804) in the set. As mentioned above, the fourth compute node (800) increments the barrier counter (816) with a value of three because three is the value of the total number of compute nodes in the set minus one. Also, the barrier control packet that the fourth compute node (806) broadcasts to each of the other compute nodes (800, 802, 804) specifies a remote get data transfer of one byte of data. As such, upon receiving the barrier control packet from the fourth compute node (806), each of the other compute nodes (800, 802, 804) decrements the value of their barrier counters by one. Immediately after $t_4$, therefore, the value for the first node's barrier counter (810) is '0,' the value for the second node's barrier counter (812) is '0,' the value for the third node's barrier counter (814) is '0,' and the value for the fourth node's barrier counter (816) is '0.' Each node (800, 802, 804, 806) then determines whether their respective barrier counter value matches the exit value of zero. Because each of the barrier counter values match an exit value of zero, each of the compute nodes (800, 802, 804, 806) exits the barrier operation and resumes processing the parallel algorithm at the point specified by the algorithm.

Readers will note from the description above that determining when a set of compute nodes participating in a barrier operation on a parallel computer are ready to exit the barrier operation according to embodiments of the present invention is carried out with minimal involvement by the processing core on each compute node. That is, after the processing core of each compute node processes instructions for entering the compute node into the barrier operation, configuring the barrier counter with a value in dependence upon a number of compute nodes in the set of compute nodes, and instructing the DMA engine to broadcast a barrier control packet to each of the other compute nodes in the set, the processing core may perform other processing tasks while waiting for the DMA engine to notify the processing core that all the compute node in the set have entered the barrier operation. Upon receiving such notification, the processing core may then exit the barrier operation and resume processing the parallel algorithm.

Exemplary embodiments of the present invention are described largely in the context of a fully functional computer system for determining when a set of compute nodes participating in a barrier operation on a parallel computer are ready to exit the barrier operation. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for determining when a set comprising a plurality of compute nodes participating in a barrier operation on a parallel computer are ready to exit the barrier operation, the method comprising, for each compute node in the set of compute nodes: initializing, by the compute node, a barrier counter with no counter underflow interrupt; configuring, by the compute node upon entering the barrier operation, the barrier counter with a value in dependence upon a number of compute nodes in the set of compute nodes; broadcasting, by a Direct Memory Access ('DMA') engine on the compute node to each of the other compute nodes in the set upon entering the barrier operation, a barrier control packet; receiving, by the DMA engine on the compute node from each of the other compute nodes in the set, a barrier control packet sent in response to each of the other compute nodes entering the barrier operation; modifying, by the DMA engine for the compute node, the value for the barrier counter in dependence upon each of the received barrier control packets; determining, by the DMA engine for the compute node, whether the value for the barrier counter matches an exit value; and exiting, by the compute node, the barrier operation if the value for the barrier counter matches the exit value.

2. The method of claim 1 wherein configuring, by the compute node, the barrier counter with a value in dependence upon a number of compute nodes in the set of compute nodes further comprises incrementing the value of the barrier counter by the number of compute nodes in the set minus one.

3. The method of claim 1 wherein modifying, by the DMA engine for the compute node, the value for the barrier counter in dependence upon each of the received barrier control packets further comprises decrementing the value of the barrier counter by one.

4. The method of claim 1 wherein the exit value is zero.

5. The method of claim 1 wherein the compute nodes in the set are configured along a same axis of a network topology for the parallel computer.

6. The method of claim 1 wherein the parallel computer comprises a plurality of compute nodes connected for data communications through a plurality of data communications networks, at least one of the data communications network optimized for point to point data communications, and at least one of the data communications networks optimized for collective operations.

7. A parallel computer for determining when a set comprising a plurality of compute nodes participating in a barrier operation are ready to exit the barrier operation, the parallel computer comprising the set of compute nodes, each compute node in the set of compute nodes comprising a computer processor and computer memory operatively coupled to the computer processor, the computer memory for each compute node in the set of compute nodes having disposed within it computer program instructions capable of: initializing, by the compute node, a barrier counter with no counter underflow interrupt; configuring, by the compute node upon entering the barrier operation, the barrier counter with a value in dependence upon a number of compute nodes in the set of compute nodes; broadcasting, by a Direct Memory Access ('DMA') engine on the compute node to each of the other compute nodes in the set upon entering the barrier operation, a barrier control packet; receiving, by the DMA engine on the compute node from each of the other compute nodes in the set, a barrier control packet sent in response to each of the other compute nodes entering the barrier operation; modifying, by the DMA engine for the compute node, the value for the barrier counter in dependence upon each of the received barrier control packets; determining, by the DMA engine for the compute node, whether the value for the barrier counter matches an exit value; and exiting, by the compute node, the barrier operation if the value for the barrier counter matches the exit value.

8. The parallel computer of claim 7 wherein configuring, by the compute node, the barrier counter with a value in dependence upon a number of compute nodes in the set of compute nodes further comprises incrementing the value of the barrier counter by the number of compute nodes in the set minus one.

9. The parallel computer of claim 7 wherein modifying, by the DMA engine for the compute node, the value for the barrier counter in dependence upon each of the received barrier control packets further comprises decrementing the value of the barrier counter by one.

10. The parallel computer of claim 7 wherein the exit value is zero.

11. The parallel computer of claim 7 wherein the compute nodes in the set are configured along a same axis of a network topology for the parallel computer.

12. The parallel computer of claim 7 wherein the parallel computer comprises a plurality of compute nodes connected for data communications through a plurality of data communications networks, at least one of the data communications network optimized for point to point data communications, and at least one of the data communications networks optimized for collective operations.

13. A computer program product for determining when a set comprising a plurality of compute nodes participating in a barrier operation on a parallel computer are ready to exit the barrier operation, the computer program product disposed upon a computer readable recordable medium, the computer program product comprising computer program instructions, for each compute node in the set of compute nodes, capable of: initializing, by the compute node, a barrier counter with no counter underflow interrupt; configuring, by the compute node upon entering the barrier operation, the barrier counter with a value in dependence upon a number of compute nodes in the set of compute nodes; broadcasting, by a Direct Memory Access ('DMA') engine on the compute node to each of the other compute nodes in the set upon entering the barrier operation, a barrier control packet; receiving, by the DMA engine on the compute node from each of the other compute nodes in the set, a barrier control packet sent in response to each of the other compute nodes entering the barrier operation; modifying, by the DMA engine for the compute node, the value for the barrier counter in dependence upon each of the received barrier control packets; determining, by the DMA engine for the compute node, whether the value for the barrier counter matches an exit value; and exiting, by the compute node, the barrier operation if the value for the barrier counter matches the exit value.

14. The computer program product of claim 13 wherein configuring, by the compute node, the barrier counter with a value in dependence upon a number of compute nodes in the set of compute nodes further comprises incrementing the value of the barrier counter by the number of compute nodes in the set minus one.

15. The computer program product of claim 13 wherein modifying, by the DMA engine for the compute node, the value for the barrier counter in dependence upon each of the received barrier control packets further comprises decrementing the value of the barrier counter by one.

16. The computer program product of claim 13 wherein the exit value is zero.

17. The computer program product of claim 13 wherein the compute nodes in the set are configured along a same axis of a network topology for the parallel computer.

18. The computer program product of claim 13 wherein the parallel computer comprises a plurality of compute nodes connected for data communications through a plurality of data communications networks, at least one of the data communications network optimized for point to point data communications, and at least one of the data communications networks optimized for collective operations.

* * * * *